April 23, 1935.  F. W. COFFING  1,999,035
VALVE FOR SPRAY TORCHES AND THE LIKE
Filed March 30, 1933
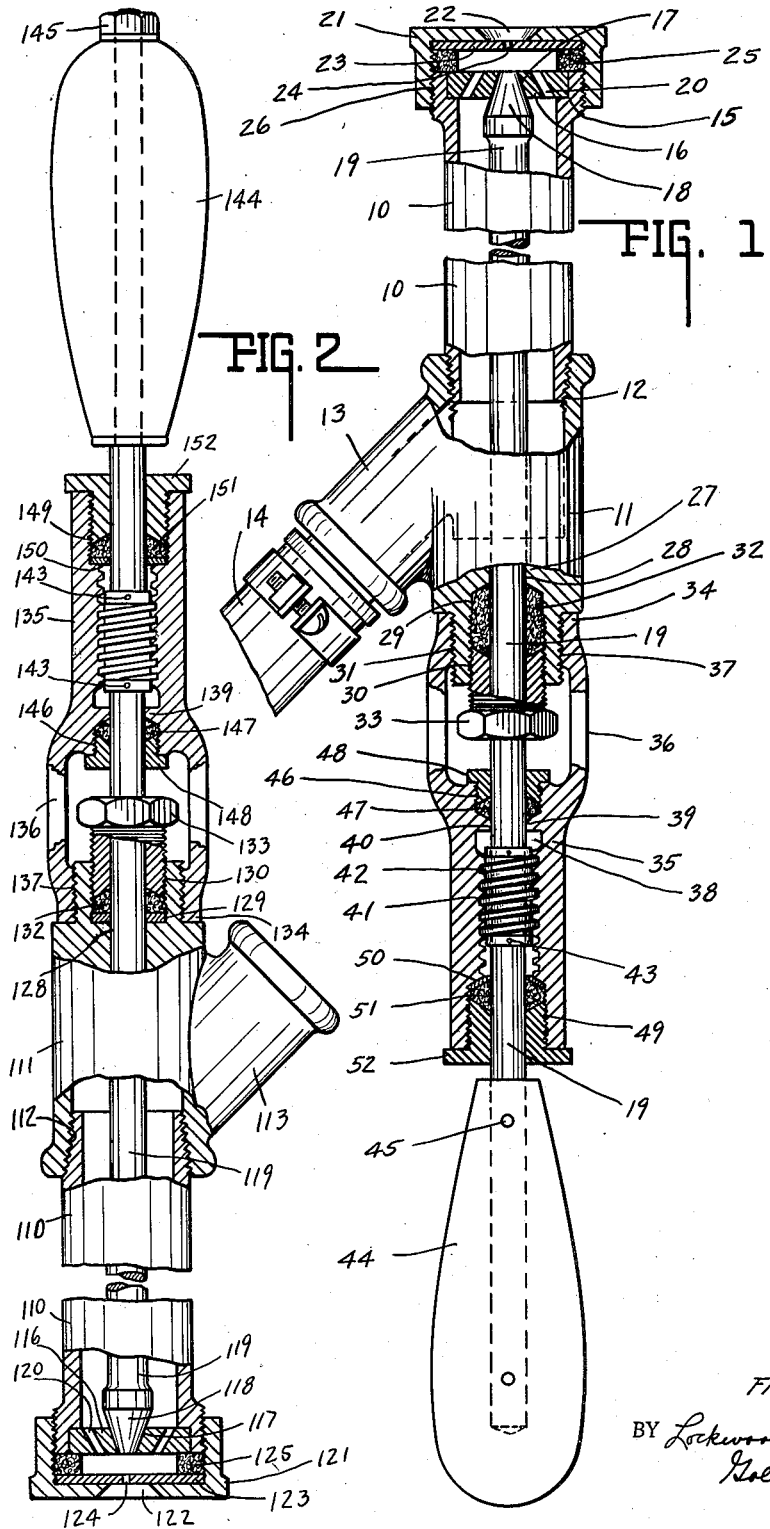
INVENTOR.
FREDRICK W. COFFING.
BY Lockwood Lockwood
Goldsmith & Gelb
ATTORNEYS.

Patented Apr. 23, 1935

1,999,035

UNITED STATES PATENT OFFICE 1,999,035

VALVE FOR SPRAY TORCHES AND THE LIKE

Fredrick W. Coffing, Danville, Ill.

Application March 30, 1933, Serial No. 663,432

4 Claims. (Cl. 251—49)

This invention relates to a portable, directional, manually controllable spray device.

The chief object of this invention is to provide a valve controlling member for a spray device whereby the spray device may be controlled, and whereby the controlling mechanism is fully protected.

Such protection is not only of a mechanical character, but also the parts are so associated together that the control mechanism is protected from corrosion which may result not only in sticking or may result in excessive wear, thereby destroying the fineness of adjustment.

The chief feature of the invention consists in enclosing in a protective arrangement the control rod which terminates in a valve associated with the nozzle of a spray device adapted for the spraying of chemicals, such as lime and/or sulphur solution discharged thereto and therethrough under pressure.

Another feature of the invention consists in the lubrication of the adjusting mechanism for securing the adjustable positioning of the valve.

The full nature of the invention will be understood from the accompanying drawing and the following description and claims:—

In the drawing, Fig. 1 is an elevational view of one form of the spray torch of a pressure spraying system, parts being broken away to show the same and other parts in section and some of the interior parts in elevation.

Fig. 2 is a similar view of a portion of a slightly modified form of the invention.

In Fig. 1 of the drawing 10 indicates a supply tube that at one end mounts a fitting 11, the latter having a tapered screw thread connection 12 therewith. The fitting 11 includes an inclined inlet 13 and communicating therewith is a flexible conduit or hose 14 that is adapted to supply the fluid to be sprayed to the tube 10 and under pressure. The tube and fitting constitute a valve chamber.

The forward end of the tubular member 10 includes a recess 15 in which is mounted a valve plate member 16 having a conical opening 17 therein which is controlled by a conical valve member 18 carried by rod 19. The plate member 16 may also have ports 20 extending therethrough. A cap 21 has an outwardly flared discharge opening 22 therein and the same is centrally positioned and is in alignment with the opening 17. A plate 23 includes a central opening 24 also in alignment with the openings before mentioned, and said plate bears on a retainer member 25 suitably secured within the cap 21, the latter being threadedly mounted as at 26 upon the threaded exterior end of the tube 10.

The aforesaid, except for the valve and the opening controlled thereby, represents an exemplification of a nozzle. Any desired or preferred form of nozzle may be substituted therefor and any desired or preferred form of valve and cooperating valve seat may be substituted for that herein disclosed, the invention being confined to the disclosure hereinafter set forth.

The body portion 11 includes a relatively elongated partition portion 27 having the bearing forming opening 28 therein which slidably and rotatably supports the rod 19. The opposite end of the member 11 is chambered as at 29 and the outer portion of said chamber is internally threaded as at 30. The member is also externally threaded as at 31.

Mounted in the chamber 29 is an adjustable seal comprising a suitable packing 32 which is retained therein by a gland nut 33 and by this construction the rearward end of the member 11 is sealed against the escape of the fluid supplied to the tube 10 under pressure by the line 14.

A bonnet includes two peripheral end portions 34 and 35 connected by the arms 36. This constitutes a unitary tubular structure having an intermediate open work arrangement. Portion 34 is internally threaded as at 37 and is threadedly mounted on the externally threaded portion 31 of the body portion 11.

The other end 35 is relatively elongated and is axially chambered as at 38, the forward end thereof being closed by the partition member 39 that is centrally apertured as at 40 to form a bearing for the projecting end of the rod 19. The chamber 38 has its interior threaded as at 41 and suitably secured upon the rod portion included within the chamber 38 is a cooperating externally threaded sleeve 42, the same being secured as at 43 to the rod or by any other suitable arrangement.

It will be apparent from the foregoing that when the elongated handle 44 suitably secured as at 45 to the free end of the rod 19, which projects beyond the chamber 38, is rotated, the rotation of said rod will not only free the valve member 18 from its seat 17 but will retract the valve 18 from the opening 17 and thereby permit the full discharge of the pressure supplied fluid from the tubular portion 10.

The aforesaid construction, therefore, is so arranged that the thread engagement is external of that portion of the tubular structure subject to the chemical fluid leakage and, therefore, it is not subject to the corrosive action thereof. This results in a valve controlling structure that can always be adjusted to the desired degree of control which heretofore has not been the case when the thread construction has been otherwise positioned and normally continuously or accidentally intermittently subject to corrosive action of the chemical fluid or to leakage therefrom, because when thus arranged, the thread structure is gradually worn away and the desired accurate adjustment of the valve cannot be obtained nor retained. The present invention, therefore, prevents excessive wearing of the threaded arrangement and insures accuracy of adjustment throughout the life of the device.

To reduce any mechanical wear to a minimum, the chamber 38 is arranged to receive lubricant and the latter is retained therein by the following means:

The forward portion of the chamber 38, as before mentioned, is closed by the partition bearing 39. The bore 40 is enlarged and is internally threaded as at 46. Mounted in the bore is the packing 47 and the latter is retained therein by the gland nut 48 which projects into the open work arrangement, the head portion of the nut bearing upon a concentric peripheral collar portion. The opposite end of the chamber is also enlarged as at 49 and is internally threaded. A packing retainer or washer 50 encircles the rod 19 and the packing 51 bears against the same, the packing being retained in the enlargement 49 by the gland nut 52 threadedly mounted therein. Nuts 49 and 33 also serve as bearings for rod 19. The chamber 38, as before mentioned, is adapted to receive lubricant which is retained therein by the aforesaid packing structures, thereby insuring minimum wear upon the thread engaging parts during the life of the spray torch.

In Fig. 2 of the drawing a slightly modified form of the invention is illustrated and like or equivalent parts are indicated by similar numerals of the one hundred series.

While the invention has been described in great detail hereinbefore, such detailed description is to be considered as illustrative and not restrictive in character, and the various modifications, which will readily suggest themselves to those skilled in the art to which this invention applies, are all considered to be within the broad scope of this invention, reference being had to the appended claims.

The invention claimed is:—

1. A device including an elongated handle, a valve controlling rod coaxially aligned therewith, having a valve at one end and associated with the handle at its opposite end, a unitary tubular structure having one end adapted for connection to the head of a valve chamber and supported thereby, said rod extending into the chamber, an adjustable seal between the rod and the chamber where the rod extends into the latter, said tubular structure having an open work arrangement adjacent the chamber connection to provide access to the exposed end of the adjustable seal, said open work arrangement permitting drainage from the tubular structure in the event of leakage through the seal, a pair of spaced bearings in said tubular structure remote from the chamber connected end of the open work arrangement, cooperating thread portions on the rod and tubular structure and within the latter and between the spaced bearings, and a seal comprising packing and an adjustable member externally exposed by the open work arrangement adjacent said thread portions and associated with the rod for preventing leakage along the rod into said thread portions.

2. A device including an elongated handle, a valve controlling rod coaxially aligned therewith having a valve at one end and associated with the handle at its opposite end, a unitary tubular structure having one end adapted for connection to the head of a valve chamber and supported thereby, said rod extending into the chamber, an adjustable seal between the rod and the chamber where the rod extends into the latter, said tubular structure having an open work arrangement adjacent the chamber connection to provide access to the exposed end of the adjustable seal, said open work arrangement permitting drainage from the tubular structure in the event of leakage through the seal, a pair of spaced bearings in said tubular structure remote from the chamber connected end of the open work arrangement, cooperating thread portions on the rod and tubular structure and within the latter and between the spaced bearings, and a seal comprising packing and an adjustable member externally exposed by the open work arrangement adjacent said thread portions and associated with the rod for preventing leakage along the rod into said thread portions, said second mentioned seal being directed toward the opposite seal and concentric with the rod whereby liquid trapped in the open work structure and not discharged therefrom is prevented from contacting the rod adjacent the second mentioned seal.

3. A device including an elongated handle, a valve controlling rod coaxially aligned therewith, having a valve at one end and associated with the handle at its opposite end, a unitary tubular structure having one end adapted for connection to the head of a valve chamber and supported thereby, said rod extending into the chamber, an adjustable seal between the rod and the chamber where the rod extends into the latter, said tubular structure having an open work arrangement adjacent the chamber connection to provide access to the exposed end of the adjustable seal, said open work arrangement permitting drainage from the tubular structure in the event of leakage through the seal, a pair of spaced bearings in said tubular structure remote from the chamber connected end of the open work arrangement, cooperating thread portions on the rod and tubuluar structure and within the latter and between the spaced bearings, a seal comprising packing and an adjustable member externally exposed by the open work arrangement adjacent said thread portions and associated with the rod for preventing leakage along the rod into said thread portions, and another seal in juxtaposition to the spaced bearing adjacent the handle for lubricant retention in the tubular structure adjacent the thread arrangement.

4. A device including an elongated handle, a valve controlling rod coaxially aligned therewith, having a valve at one end and associated with the handle at its opposite end, a unitary tubular structure having one end adapted for connection to the head of a valve chamber and supported thereby, said rod extending into the chamber, an adjustable seal between the rod and the chamber where the rod extends into the latter, said tubular structure having an open work arrangement adjacent the chamber connection to provide access to the exposed end of the adjustable seal, said open work arrangement permitting drainage from the tubular structure in the event of leakage through the seal, a pair of spaced bearings in said tubular structure remote from the chamber connected end of the open work arrangement, cooperating thread portions on the rod and tubular structure and within the latter and between the spaced bearings, a seal comprising packing and an adjustable member externally exposed by the open work arrangement adjacent said thread portions and associated with the rod for preventing leakage along the rod into said thread portions, said second mentioned seal being directed toward the opposite seal and concentric with the rod whereby liquid trapped in the open work structure and not discharged therefrom is prevented from contacting the rod adjacent the second mentioned seal, and another seal in juxtaposition to the spaced bearing adjacent the handle for lubricant retention in the tubular structure adjacent the thread arrangement.

FREDRICK W. COFFING.